May 30, 1933. W. B. COSBY 1,911,991
ENGINE
Filed March 16, 1931 3 Sheets-Sheet 1

INVENTOR.
William B. Cosby
BY Arthur C. Brown
ATTORNEY.

May 30, 1933.  W. B. COSBY  1,911,991
ENGINE
Filed March 16, 1931   3 Sheets-Sheet 2

INVENTOR.
William B. Cosby
BY
Arthur C. Brown
ATTORNEY.

May 30, 1933.  W. B. COSBY  1,911,991
ENGINE
Filed March 16, 1931   3 Sheets-Sheet 3

INVENTOR.
William B. Cosby
BY
Arthur Le Brown
ATTORNEY.

Patented May 30, 1933

1,911,991

UNITED STATES PATENT OFFICE

WILLIAM B. COSBY, OF KANSAS CITY, MISSOURI

ENGINE

Application filed March 16, 1931. Serial No. 523,043.

This invention relates to internal combustion engines and particularly to those of the two cycle type, the principal object of the invention being to provide a more efficient two cycle engine wherein the explosive charge is drawn into a compression cylinder and discharged into an expansion cylinder after exhaust gases from a previous charge have been scavenged from the expansion cylinder.

It is also an object of the invention to provide an improved valve mechanism for operating the valves controlling passage to and from the respective cylinders.

It is a further object of the invention to provide for preheating of the combustion-supporting air and the automatic injection of the fuel into the stream of air drawn into the compression cylinder.

In accomplishing these and other objects of the invention, I have provided improved details of structure, the preferred form of which is illustrated in the accompanying drawings, wherein.

Referring more in detail to the drawings:

1 and 2 designate sets of engine cylinders which are of identical construction and for the sake of clearness only one of the sets will be described in detail, the parts of one set being complementary to the parts of the other set.

Figure 2:
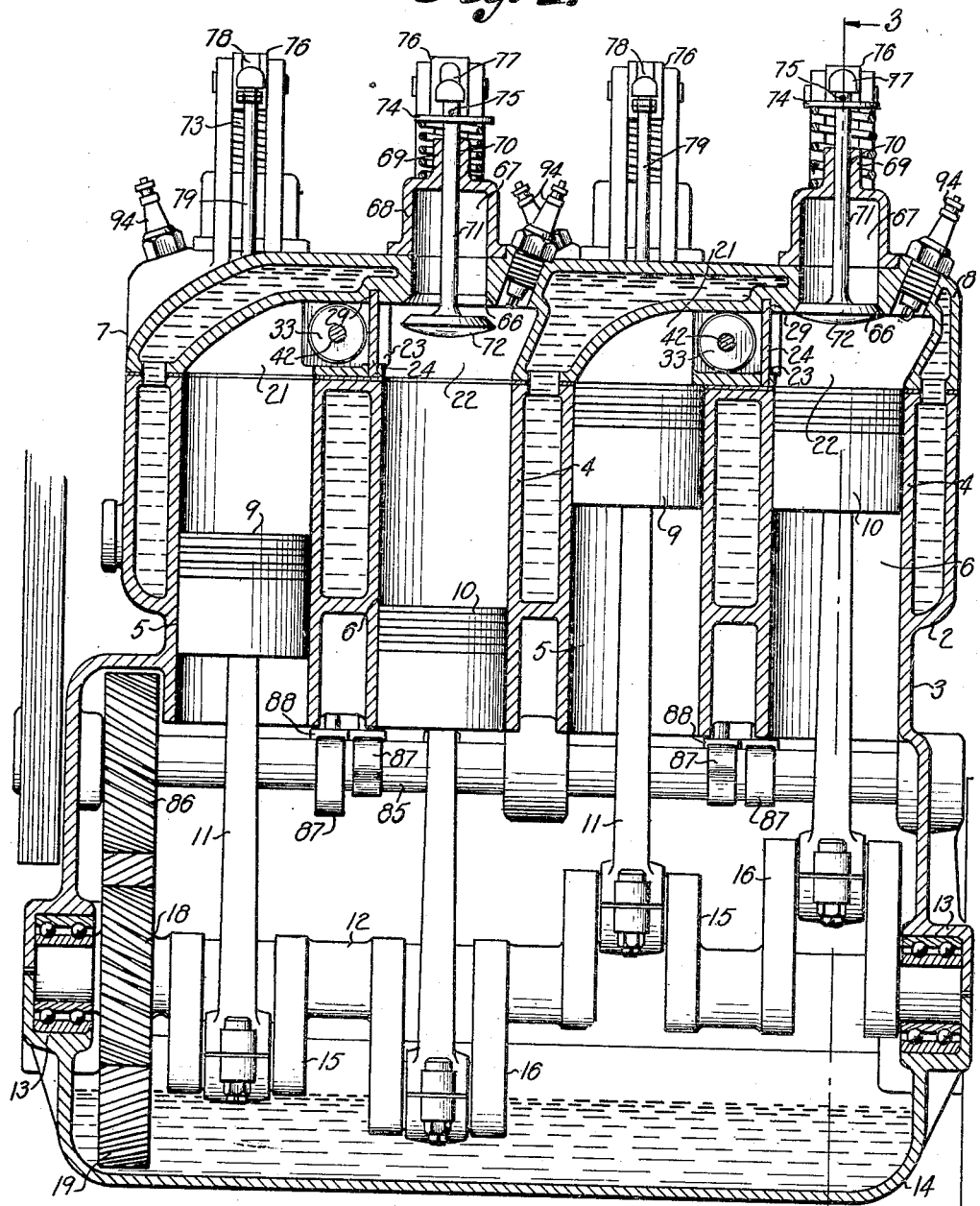
Fig. 2 is a longitudinal sectional view through one set of engine cylinders on the line 2—2, Fig. 1.

Each set comprises an engine block 3 having a plurality of cylinders 4, here shown as four in number, which are connected together in pairs of two. Each pair comprises a compression cylinder 5 and an expansion cylinder 6. The cylinders and the cylinder head 7 are provided with the usual water jackets 8 for dissipating heat of compression and combustion. The head 7 is preferably a single unit and extends across the pairs of cylinders in each block, as best illustrated in Fig. 2.

Slidable in the compression and expansion cylinders are pistons 9 and 10 respectively that are operated by usual connecting rods 11 from a crank shaft 12. The crank shaft 12 is rotatably mounted in anti-friction bearings 13 carried in the ends of the crank case 14.

Attention is here called to the difference in strokes between the compression pistons and the power pistons since the cranks 15 operating the compression pistons are of shorter throw than the throw of the cranks 16 operating the power pistons. The crank 16 is preferably slightly in advance of the crank 15 so that the piston 10 moves in advance of the piston 9. This is important as it provides a long power stroke and it also allows time for the spent gases to be completely scavenged from combustion cylinders before a new compressed charge is admitted as later described.

Attention is also called to the arrangement of the cranks. The respective cranks 15 and 16 project from the same sides of the crank shafts so that each compression piston operates in the same direction as its related expansion piston.

The crank case 14 extends entirely across the width of the engine to support both sets of cylinders and is provided with bearings 17 similar to the crank shaft bearings 13 for rotatably mounting the crank shaft of the other set of cylinders.

Each crank shaft is provided at its end with a helical gear 18 which meshes with a helical gear 19 on a power shaft 20 extending longitudinally of the crank case between the respective crank shafts of the engine. The power shaft 20 is rotatably mounted in suitable anti-friction bearings similar to the bearings 13 and 17 and extends through the rear of the case where it may be connected to any suitable operating mechanism.

The cylinder head 7 is provided above each compression cylinder 5 and each expansion cylinder 6 with a fuel mixing chamber 21 and a combustion chamber 22 respectively. The chambers 21 and 22 are connected by a transfer port 23 that is controlled by a slide valve 24 so that flow from the mixing chamber to the combustion chamber may be controlled as later described.

Figures 3, 4:
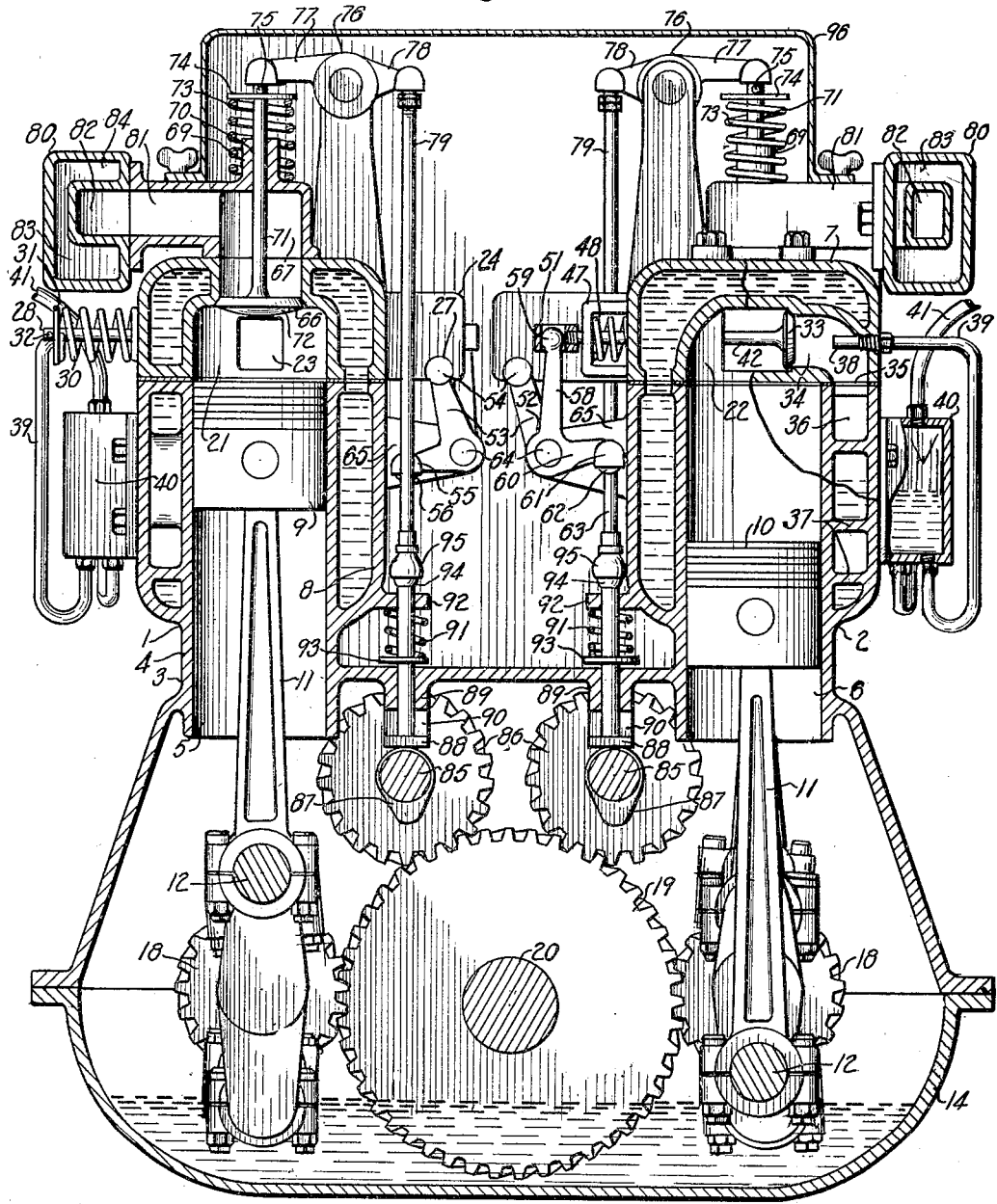
Fig. 3 is a vertical cross sectional view through the engine on the line 3—3, Fig. 2.
Fig. 4 is a perspective view of one of the slide valves.

The slide valve 24 is best illustrated in Fig. 4 and comprises a plate 25 rectangular in cross section and of suitable size to close the port 23 between the respective chambers. The plate 25 is provided adjacent one end with an opening 26 which is adapted to move into position to permit passage of compressed gases through the port 23 into the expansion cylinder as later described. The plate is further provided at one end with a circular notch 27 for receiving the end of a bell crank lever for operating the valve, and at the opposite end is a stem 28.

The valve plate is slidable on edge transversely between the compression and expansion cylinders in a rectangular recess 29 extending entirely through the cylinder head, thereby permitting the stem 28 to project from the outer side of the cylinder head and the notched end 27 from the inner side.

In order to normally retain the plate in position for closing the port to the combustion chamber and the port 26 covered, I provide a coil spring 30 sleeved on the stem 28 and having one end bearing against the cylinder head and its opposite end bearing against a washer 31 secured on the end of the stem by a suitable pin 32.

The valve plates thus described are preferably located adjacent the combustion chambers of each pair of cylinders to provide room in the ports 23 for accommodating in each port an intake valve 33 which controls a fuel inlet port 34 communicating with port 26 substantially mid-way between compression and combustion chambers. The ports 34 are formed in the cylinder head and communicate through openings 35 with an air supply passageway 36 extending longitudinally of the cylinder block. The passageway 36 is preferably formed in the block within the water jacket and extends in a hairpin loop from the forward end of the cylinder block to the rear end where it curves upwardly and returns along the upper end of the cylinder block, communicating with the openings 35 in the cylinder head, the passageways being preferably formed by longitudinal partitions 37 cast in the block.

Figure 1:
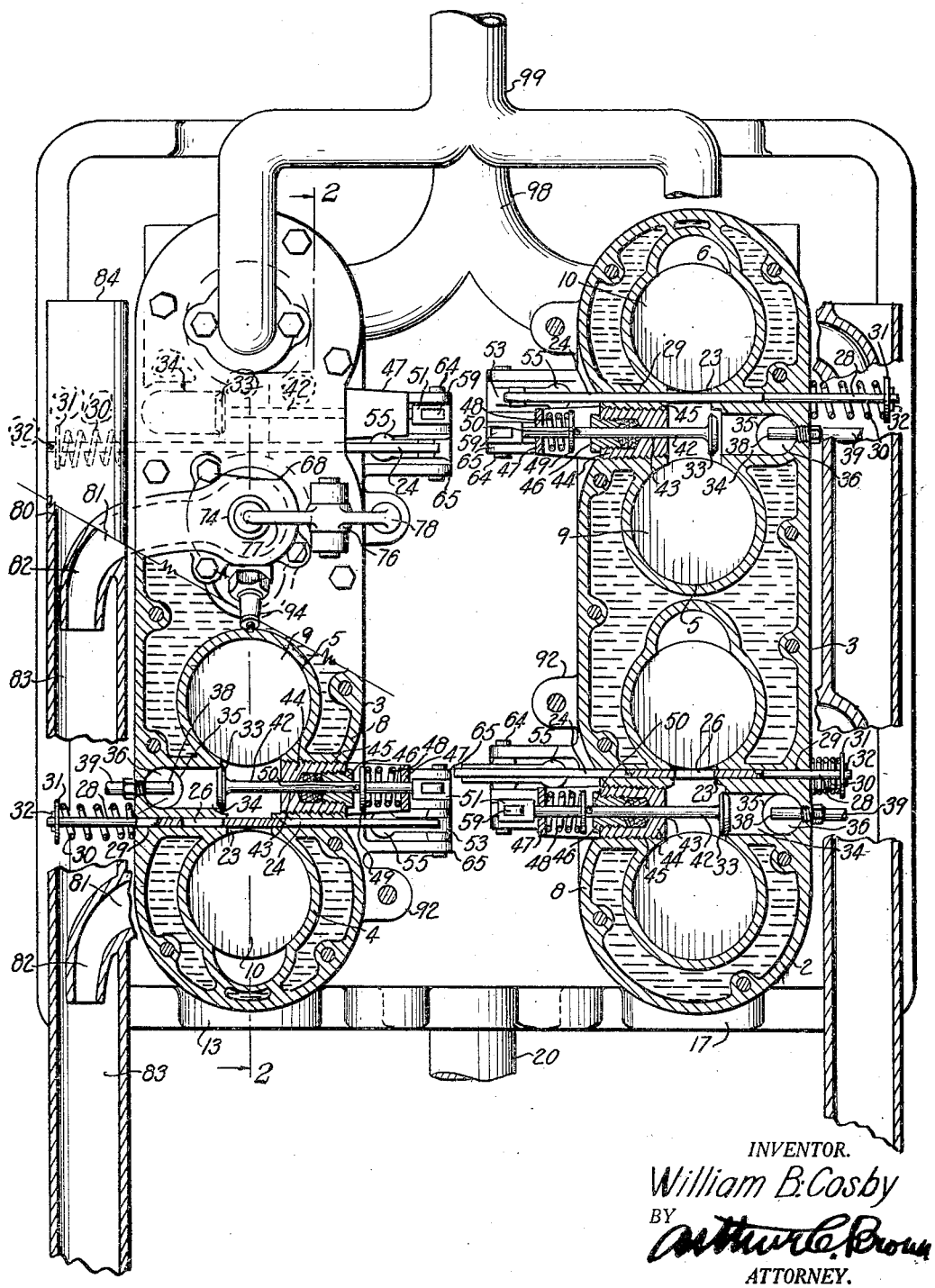
Fig. 1 is a plan view of an engine constructed in accordance with my invention, a part being shown in section to better illustrate the valve mechanism and cylinder arrangement.

It is obvious that the air is preheated by its passage through the water jacket in substantial contact with the walls of the cylinders. The fuel is preferably automatically injected into the ports 34 by the siphoning effect of the air drawn into the cylinders, the fuel being supplied through suitable nozzles 38 threaded into the walls of the cylinder head and extending concentrically of the ports, as illustrated in Figs. 1 and 3.

The nozzles are connected by suitable conduits 39 with a fuel supply chamber 40 which is filled from a suitable storage tank (not shown) by means of suction of the engine cylinders through a pipe 41 communicating the storage and the chamber 40.

The intake valves 33 are of the ordinary poppet type and have stems 42 slidably mounted in axial bores 43 in blocks 44 that are threaded in openings 45 in the inner sides of the cylinder head, opposite to and in alignment with, the port 34.

The blocks 44 are provided with suitable packing glands 46 to prevent escape of compressed charges around the valve stems 42. The valve stems thus extend parallel with the slide valve plates previously described, and their projecting ends extend through yokes 47 preferably carried by the blocks 44.

In order to retain the valves in normally closed position, that is shutting off communication between the intake and the compression cylinders, I provide a valve spring 48 for each valve which is coiled about its stem and has one end engaging against the yoke and the opposite end against a washer 49 fixed on the valve stems by a pin 50.

Carried on the free end of each valve stem is a slotted head 51 for receiving the arm of a bell crank lever 52 similar to the bell crank levers for operating the slide valves 24. The bell crank levers 52 for operating the plate are each provided with a vertically extending arm 53 having a cylindrical shaped end 54 engaged in the notch 27 of its valve. The other arm of the bell cranks 52 is provided with a ball socket 55 for receiving the ball end 56 of a valve stem 57 reciprocably mounted vertically of the engine block.

The bell cranks for the valves 33 are each provided with a vertically extending arm 58 having a ball end 59 received in slotted heads 51 and an arm 60 provided with a ball socket 61 for receiving the ball head 62 of a valve stem 63.

The bell cranks thus described are pivotally mounted between the compression and expansion cylinders on horizontal pins 64 carried by spaced ears 65 extending from the inner side of the cylinder block the ears being spaced to accommodate to the bell crank levers as illustrated in Fig. 1.

Each combustion chamber is provided with an axial exhaust port 66 extending vertically through the cylinder head and communicating with exhaust outlet chambers 67 fixed to the cylinder head by suitable fastening devices 68. The chambers 67 are provided with vertical bosses 69 having bores 70 for receiving stems 71 of an exhaust valve 72 for closing the ports 66.

The valve stems project upwardly from the boss 69 and sleeved over each stem is a spring 73 having one end bearing against the member 68 and its opposite end against a washer 74 retained on the end of a stem by a pin 75 so that the valves are normally retained in closed position due to tension of the springs 73.

The exhaust valves are operated by rocker arms 76 having one of their ends 77 engaging the end of the exhaust valve stems and their opposite ends 78 engaging valve actuating rods 79 positioned vertically of the cylinder blocks along side the valve operating rods previously described.

The exhaust chambers 67 are connected with suitable manifolds 80 by conduits 81 having curved ends 82 discharging into the exhaust manifold 83 so that the hot gases escaping through the curved ends 82 siphon cool air from the forward end 84 of the exhaust pipe to reduce temperature of the gases and maintain a cooling effect on the manifold.

The valves for each set of cylinders are actuated by spaced cam shafts 85 rotatably mounted in the crank case and provided with gears 86 meshing with the gear 19 on the power shaft. The gears 86 are of the same diameter as the crank shaft gears so that the cam shafts are operated at the same speed as the crank shafts.

The cam shafts are provided with cams 87 for operating cam followers 88 slidably mounted in bosses 89 formed in the top of the crank case 14. The ends of the followers are also guided by lugs 90 projecting from the inner face of the cylinder blocks. The cam followers are retained in engagement with the cams by springs 91 having one end bearing against a lug 92 and their opposite end bearing against a collar 93 fixed to the follower stems.

The follower stems are preferably provided with ball ends 94 for receiving ball cups 95 on the ends of the actuating rods previously described. The valve mechanism is preferably enclosed by a suitable cover 96 as illustrated in Fig. 3.

The combustion chambers are provided with suitable spark plugs 94 threaded into the cylinder head adjacent each exhaust valve.

The water jackets of the respective cylinder blocks are supplied through a manifold 98 communicating with the lower forward ends of the cylinder blocks and the hot water is returned to a suitable radiator, not shown, through a manifold 99 connecting the cylinder heads as illustrated in Fig. 1.

In operating an engine constructed and assembled as described on the first cycle, the piston in the compression chamber is moved downwardly in its cylinder by the crank 15, drawing a combustible mixture into the compression chamber through the valve 33 which has been opened by the valve mechanism to permit the vacuum created in the cylinder to draw in combustion-supporting air and a fuel charge through the nozzle 38 from the chamber 40. When the piston 9 has reached the end of its intake stroke the valve 33 is closed under influence of the spring 48. The piston then begins its second cycle to compress the fuel charge trapped in the compression chamber, the slide valve 24 being closed.

Just before the piston 9 has reached the upper end of its stroke the slide valve will be actuated to bring the port 26 into communication with the port 23 and the compressed gases will escape through the port in the valve into the combustion chamber 22, attention being directed to the fact that the expansion piston 10 has reached the upper end of its stroke at the time the slide valve opens so that the compression gained in the compression cylinder is not lost in the expansion cylinder.

As soon as the charge has been transferred from the compression cylinder to the expansion cylinder the slide valve 24 is actuated by its spring 30 to close the port 23. A spark is then passed across the terminals of the spark plug to ignite the charge in the combustion chamber which propels the piston 10 downwardly on its power stroke, at which time the piston 9 is moved downwardly to draw in another fuel charge through the valve 33 which has been reopened to admit flow through the fuel port 34.

When the piston 10 has reached the end of its power stroke the exhaust valve 72 is opened by its operating mechanism and as the piston moves upwardly on its scavenging stroke the exhaust gases are forced out through the exhaust manifold. During the time that the piston 10 is moving upwardly on its scavenging stroke the piston 9 is moving upwardly on its compression stroke. When the pistons have reached approximately the end of their strokes the exhaust valve closes and the slide valve is again opened to permit the compressed charge in the chamber 21 to transfer into the chamber 22. The plate 24 is then closed as previously described, and the charge is combusted and the piston 10 completes its second power stroke and the piston 9 is on its third intake stroke.

It is thus apparent that the charge drawn into the compression chamber is compressed and transferred into the combustion chamber which has been comparatively freed of burnt gases at the time the power piston 10 has reached the upper end of the stroke so that the fuel charge is not diluted by the spent gases as in ordinary two cycle engines and the power piston receives the full force of the explosive gases compressed in the compression cylinder.

While the engine here illustrated shows two sets of cylinders, that is, two compression and expansion cylinders in each set, it is obvious that an engine may be constructed with any number of sets of compression and expansion cylinders depending upon the purpose for which the engine is to be employed.

In some constructions the sets of cylinders on one side of the engine may be positioned at an angle to the other set so that a single crank shaft may be employed to operate both sets as in the ordinary V type motor, or all the sets may be in line and operated by a single crank shaft.

Attention is also directed to the difference in gear ratio between the crank shaft gears and the large gear on the power shaft so that the power shaft operates at a lower speed than the crank shafts. In some instances this gear reduction eliminates the necessity of further speed reduction.

What I claim and desire to secure by Letters Patent is:

1. In an internal combustion engine of the character described, a fuel compression cylinder, an expansion cylinder having communication with the compression cylinder, a valve controlling communication between said cylinders, a piston operable in each of said cylinders, a crank shaft to reciprocate said pistons simultaneously in the same direction connected with the pistons and having one crank set slightly in advance of the other, means operating in timed relation with said pistons to open the valve for transferring a fuel compressed in the compression cylinder into the expansion cylinder when the pistons have substantially reached the top of their strokes, and means for igniting the fuel in the expansion cylinder.

2. In an internal combustion engine of the character described, a fuel compression cylinder, an expansion cylinder communicating with the compression cylinder, a valve controlling communication between said cylinders, a piston in each cylinder, one having different length stroke than the other, means operably connecting the pistons to reciprocate the pistons, simultaneously in the same direction, and means for actuating the valve to permit the fuel compressed in the compression cylinder to transfer to the expansion cylinder when the pistons have substantially reached the tops of their strokes, and means for igniting the compressed fuel in the expansion cylinder.

3. In an internal combustion engine of the character described, a fuel compression cylinder, an expansion cylinder having communication with the compression cylinder and having an exhaust port, a valve controlling communication between the upper ends of said cylinders, means for supplying a fuel to the compression cylinder, a valve controlling the exhaust port in the expansion cylinder, a piston operable in each cylinder, means differentially moving the pistons whereby the pistons effect differential displacement in the cylinders, means for actuating the first named valve for transferring a fuel charge compressed in the compression cylinder into the expansion cylinder when the piston in the expansion cylinder has completed a scavenging stroke and the piston in the compression cylinder has completed its compression stroke, and means for igniting the compressed fuel in the expansion cylinder to move the piston in the expansion cylinder on a power stroke and the piston in the compression cylinder simultaneously on its intake stroke.

4. In an internal combustion engine of the character described, a fuel compression cylinder, an expansion cylinder having communication with the compression cylinder and having an exhaust port, a slide valve controlling communication between said cylinders, means for supplying a fuel to the compression cylinder, a valve controlling the exhaust port in the expansion cylinder, a piston operable in each cylinder, a shaft including a crank for operating the piston in the compression cylinder and a similarly positioned crank having longer throw than the first named crank to operate the piston in the expansion cylinder simultaneously and in the same direction, means for actuating the slide valve for transferring a fuel charge compressed in the compression cylinder into the expansion cylinder when the piston in the expansion cylinder has completed its scavenging stroke, and means for igniting the compressed fuel in the expansion cylinder to move the piston in the expansion cylinder on its power stroke and the piston in the compression cylinder on its intake stroke.

5. In an internal combustion engine of the character described, a compression cylinder having an intake port, an expansion cylinder having communication with the compression cylinder, a reciprocating piston in each cylinder, means for operably actuating said pistons in unison at different speeds so that the piston in the expansion cylinder has the greater displacement, a valve controlling the intake port, a valve controlling communication between said cylinders, means for supplying combustion-supporting air to said intake port, a fuel supply nozzle discharging centrally into the intake port, in the path of the combustion supporting air, means for actuating the inlet valve to permit the piston in the compression cylinder to simultaneously draw in an air and fuel charge on its intake stroke, means for actuating the last named valve to transfer fuel compressed in the compression cylinder into the expansion cylinder, means for igniting the fuel charge in the expansion cylinder, and means for exhausting the combusted fuel from the expansion cylinder on the scavenging stroke of the piston in the expansion cylinder.

6. In an internal combustion engine of the character described, a compression cylinder having an intake port, a valve normally closing said port, a piston in the cylinder, means for actuating the piston, an air supply conduit communicating with the intake port, a fuel discharge nozzle positioned to discharge fuel within the air stream delivered in said conduit, means for actuating said valve to permit the piston to simultaneously draw in an air and fuel charge by means of suction created on the intake stroke of the piston to mix in the compression cylinder, an expansion cylinder associated with the compression cylinder, and means for transferring compressed fuel charges from the compression cylinder into the expansion cylinder.

7. In an internal combustion engine, an engine block including a compression cylinder and an expansion cylinder, a head for the block having a conduit connecting said cylinders to transfer fuel from the compression to the expansion cylinder and having a transverse slot intersecting said conduit, a piston in each cylinder, means operably connecting the pistons to reciprocate the pistons simultaneously in the same direction, a horizontally positioned valve plate slidable transversely in said slot and having a port adapted to register with said conduit to permit transfer of a fuel charge when the pistons have substantially reached the top of their strokes, means operable from the piston actuating means for moving said valve plate in one direction, and a spring having one end bearing against a side of the head and its other end anchored to said valve to move the valve plate in the reverse direction.

In testimony whereof I affix my signature.

WILLIAM B. COSBY.